(12) United States Patent
Elul et al.

(10) Patent No.: US 12,744,735 B2
(45) Date of Patent: Sep. 22, 2026

(54) LOAD BALANCING CLIENT CONNECTIONS ACROSS SERVERS OF A TRUST NETWORK

(71) Applicant: HEWLETT PACKARD ENTERPRISE DEVELOPMENT LP, Spring, TX (US)

(72) Inventors: Natan Elul, Tel Aviv (IL); Roy Azachi, Tel Aviv (IL); Gil Azrielant, Tel Aviv (IL)

(73) Assignee: Hewlett Packard Enterprise Development LP, Spring, TX (US)

( * ) Notice: Subject to any disclaimer, the term of this patent is extended or adjusted under 35 U.S.C. 154(b) by 27 days.

(21) Appl. No.: 18/773,755

(22) Filed: Jul. 16, 2024

(65) Prior Publication Data

US 2025/0047605 A1 Feb. 6, 2025

Related U.S. Application Data

(60) Provisional application No. 63/516,663, filed on Jul. 31, 2023.

(51) Int. Cl.
*H04L 47/125* (2022.01)
*H04L 9/40* (2022.01)

(52) U.S. Cl.
CPC ........ *H04L 47/125* (2013.01); *H04L 63/0272* (2013.01); *H04L 63/0281* (2013.01)

(58) Field of Classification Search
CPC ............. H04L 12/4633; H04L 12/4641; H04L 47/125; H04L 63/0236; H04L 63/0272; H04L 63/0281; H04L 63/029; H04L 63/0428; H04L 63/166; H04L 63/168; H04L 63/20; H04L 67/02; H04L 67/56
See application file for complete search history.

(56) References Cited

U.S. PATENT DOCUMENTS 9,106,482 B1 * 8/2015 Bapat .................. H04L 67/1019
11,528,320 B1 * 12/2022 Paralikar ............. H04L 43/0888
2002/0174034 A1 * 11/2002 Au ......................... G06Q 30/06 705/26.81
2017/0163724 A1 * 6/2017 Puri ...................... G06F 9/5083
2019/0372936 A1 12/2019 Sullenberger et al.
2020/0412825 A1 * 12/2020 Siefker ............... H04L 67/1027
2021/0392079 A1 * 12/2021 Slovetskiy .............. H04L 69/22
2022/0166647 A1 5/2022 Norbutas et al.
(Continued)

FOREIGN PATENT DOCUMENTS

WO WO-2024081014 A1 * 4/2024 ......... H04L 67/2895

OTHER PUBLICATIONS

Donenfeld, NDSS, WireGuard: Next Generation Kernel Network Tunnel, 2017 (12 pages).
(Continued)

*Primary Examiner* — Christopher Biagini
(74) *Attorney, Agent, or Firm* — Trop, Pruner & Hu, P.C.

(57) ABSTRACT

In some examples, a proxy system establishes a client-side secure network tunnel between the proxy system and a client device, and establishes a plurality of server-side secure connections between the proxy system and respective servers of a trust network. The proxy system load balances a plurality of connections of the client device in the client-side secure network tunnel across the servers of the trust network through respective server-side secure connections of the plurality of server-side secure connections.

20 Claims, 3 Drawing Sheets

(56) References Cited

U.S. PATENT DOCUMENTS

| | | | | |
|---|---|---|---|---|
| 2022/0345491 | A1* | 10/2022 | Luo | H04L 63/20 |
| 2022/0385637 | A1 | 12/2022 | Thangapandi et al. | |
| 2022/0394016 | A1 | 12/2022 | Solanki et al. | |
| 2023/0076070 | A1 | 3/2023 | Gupta et al. | |
| 2023/0118718 | A1 | 4/2023 | Solanki et al. | |
| 2023/0208923 | A1* | 6/2023 | Woodworth | H04L 63/0428 709/223 |
| 2023/0344921 | A1 | 10/2023 | Duraisamy et al. | |
| 2023/0421471 | A1* | 12/2023 | Beredimas | H04L 43/0864 |
| 2024/0129310 | A1* | 4/2024 | Andrews | H04L 63/08 |
| 2025/0047606 | A1 | 2/2025 | Elul et al. | |

OTHER PUBLICATIONS

Elul et al., U.S. Appl. No. 18/773,763 entitled Load Balancing VPN Traffic filed Jul. 16, 2024 (32 pages).
Kubernetes, Nodes dated on or before Jul. 9, 2023 (10 pages).
Michael Kerrisk, namespaces(7)—Linux manual page, Dec. 2023 (7 pages).
Russell et al., iptables(8)—Linux man page downloaded Jun. 6, 2024 (34 pages).
Scholz et al., Performance Implications of Packet Filtering with Linux eBPF, 2018 (9 pages).
StrongSwan Documentation, Route-based VPN available—May 21, 2023 (13 pages).
Wikipedia, WireGuard, Jul. 16, 2023 (8 pages).
Wireguard Fast, Modern, Secure VPN Tunnel available Jul. 30, 2023 (7 pages).
Wu, Master's Thesis, Analysis of the WireGuard protocol, Jun. 17, 2019 (88 pages).

* cited by examiner

LOAD BALANCING CLIENT CONNECTIONS ACROSS SERVERS OF A TRUST NETWORK

CROSS-REFERENCE TO RELATED APPLICATION

This application claims the benefit under 35 U.S.C. § 119 (e) of U.S. Provisional Patent Application No. 63/516,663, filed Jul. 31, 2023, which is hereby incorporated by reference.

BACKGROUND

In network computing, secure network protocol suites allow communication between clients and servers in a secure manner over a public network, such as the internet. This is advantageous, as public networks are not secure, and are therefore a security risk. Public networks also form much of the backbone of worldwide communication, and so are commonly used.

BRIEF DESCRIPTION OF THE DRAWINGS

Some implementations of the present disclosure are described with respect to the following figures.

Figure 1:
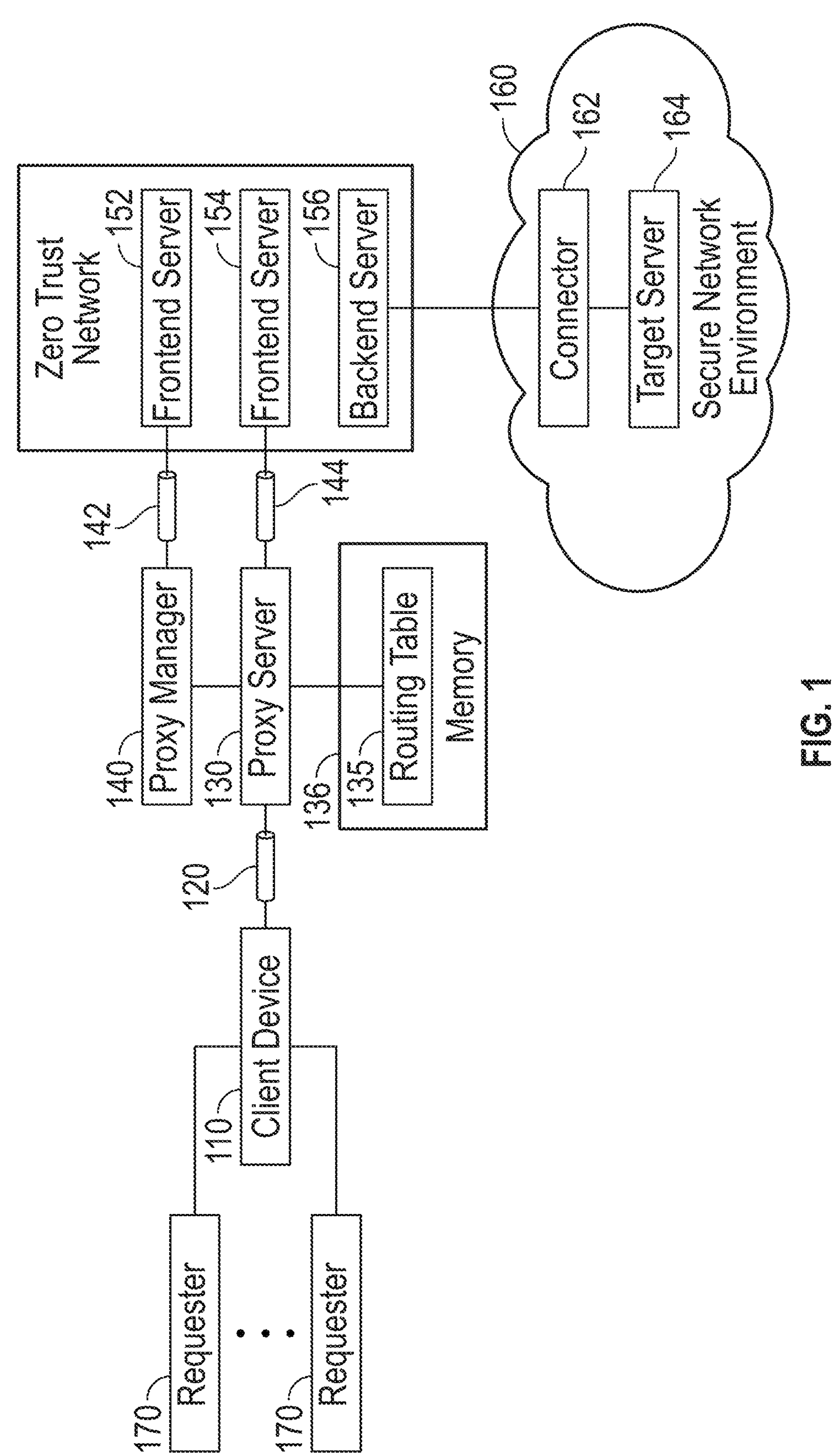
FIG. 1 is a block diagram of an arrangement that includes a client device, a proxy server, a zero trust network, and a secure network environment, according to some examples.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

A zero trust network uses a security model that establishes trust through continual authentication and monitoring of each network access attempt by entities, such as users, devices, and programs. The entities are not trusted implicitly or by default (such as when the entities perform network access from a local network that is assumed to be more secure than an external network). Rather, with each network access, the entities have to be validated before network access can be granted to the entities.

Client devices may connect to target resources of the zero trust network. In some examples, the resources of the zero trust network include destination servers, which are compute entities (physical servers or virtual servers) of the zero trust network with which secure connections can be established by devices for accessing target endpoints through the zero trust network. However, if a client device establishes a secure connection directly with a destination server, the destination server may become overloaded with traffic of client connections between the client device and the destination server. In some examples, the client device may be a router, a gateway, or another type of network device through which electronic devices can connect to other endpoints. If the client device supports a relatively large quantity of electronic devices, then there may be a large quantity of client connections (corresponding to traffic of the electronic devices) between the client device and the destination server of the zero trust network. If the destination server becomes overloaded, then the performance of network communications of the electronic devices may suffer.

Additionally, if the destination server were to become unavailable for any reason, then the client device would have to terminate the secure connection to the destination server and re-establish another secure connection with another destination server of the zero trust network. The re-establishment of a new secure connection when a destination server of the zero trust network becomes unavailable can cause temporary loss of service to the client device.

In accordance with some implementations of the present disclosure, a proxy system can be provided between a client device and a trust network, such as a zero trust network, so that a client-side secure network tunnel can be established between the client device and the proxy system, and separate server-side secure connections can be established between the proxy system and respective destination servers of the trust network. As used here, a "secure network tunnel" can refer to a secure connection in which one or more client connections can be provided. A "client connection" can refer to a connection established by a client device with a target endpoint. In some examples, a client connection can include a Transmission Control Protocol (TCP) connection according to the TCP protocol. In other examples, client connections can be established according to other transport protocols.

A server-side secure connection established between the proxy system and respective destination server of the trust network can refer to any connection in which transferred data is protected against unauthorized access. For example, the server-side secure connection can include a server-side secure network tunnel established between the proxy system and the respective destination server. As another example, the server-side secure connection can be a connection established over a network link within the trust network. In the latter case, a secure network tunnel between the proxy system and the respective destination server is not established.

A "trust network" can refer to a network environment in which a compute entity performs authorization of access requests from client devices. An example of the trust network is a zero trust network. Load balancing can be applied in which client connections of the client device in the client-side secure network tunnel can be load balanced across multiple destination servers of the trust network. A "destination server" in the trust network refers to a resource of the trust network with which a secure connection can be established. In some examples, the destination server may also be able to perform authorization of access requests. Alternatively, the destination server may forward an access request to another entity in the trust network to perform the authorization.

An access request can include a control message that is transmitted by a requester to connect to a target endpoint. In other examples, an access request can include a data packet transmitted by the requester that is to reach the target endpoint. In some examples, a destination server may also be referred to as a frontend server or a virtual private network (VPN) backend server (in examples where a VPN is used).

Additionally, if a given destination server in the trust network were to become unavailable for any reason, then traffic of client connections can be moved from a first server-side secure connection established with the given destination server to a second server-side secure connection established with another destination server in the trust network, without having to re-establish the client-side secure network protocol. The given destination server may become unavailable due to a fault of the given destination server, a fault of a communication link to the given destination server, the given destination server being updated (for repair or maintenance such as to update an OS, firmware, or software), or the given destination server becoming overburdened with workload.

A security protocol suite, such as an Internet Protocol Security (IPSec) suite, can be used for secure communications. In some examples, IPSec can be used in VPNs. A secure network tunnel can be established using IPSec as the tunneling protocol. To communicate data through an IPSec network tunnel, an encryption algorithm is applied to a data packet (such as an Internet Protocol (IP) packet), and the protected data packet is wrapped within outer headers, including an authentication header (AH) or an encapsulating security payload (ESP) header.

Using techniques or mechanisms according to some examples of the present disclosure, an IPSec protocol can be employed in a network arrangement with a trust network such as a zero trust network. Also, a client-side IPSec-based secure network tunnel does not have to be dropped and re-established when a destination server in the trust network becomes available. In other examples, secure network tunnels can be established using other security protocols that encrypt a payload of a data packet.

The various disclosed examples of the present disclosure include methods and systems for providing secure network tunnels for communications between a client device and a zero trust network. In some examples, a proxy system establishes a first (client-side) secure network tunnel with a client device, and establish a second (server-side) secure connection with a destination server in the zero trust network. This network architecture allows to maintain the first (client-side) secure network tunnel between the proxy system and the client device, while implementing as many second (server-side) secure connections to respective destination servers in the zero trust network as required.

For example, according to some examples, the provision of the client-side secure network tunnel and server-side secure connections allows for the transfer (e.g., handoff) of communications (in client connections) of the client device from a first destination server to a second destination server in the zero trust network, without having to re-establish the client-side secure network tunnel, i.e., only change where traffic of the client connections is transferred on the server side, such as by moving the traffic of the client connections to another existing server-side secure connection or a new server-side secure connection that connects to another destination server in the zero trust network.

In some examples, when a given destination server is marked for maintenance, the proxy system can halt the assignment of new secure network tunnels to the given destination server. However, existing secure network tunnels to the given destination server remain uninterrupted. The data packets of the existing secure network tunnels are allowed to be "drained" from the given destination server, which refers allowing the communications of data packets through the existing secure network tunnels to complete. However, new traffic is not forwarded to the given destination server which is to be taken down for maintenance.

In some examples, a routing table, rule, filter, combination thereof, and the like, is updated to re-route data packets from the client device which were originally directed to a first destination server, to a second destination server. Generally, a routing table, rule, filter, or combination thereof, and the like, may be referred to as "routing information" that controls the routing of traffic of a client connection to a destination server.

In some examples, the update of the routing information is part of a dynamic load balancing scheme that increases (or decreases) the number of destination servers to which the proxy system is able to direct data packets from a client device.

In some examples, the client device is a router, gateway, or another type of network device, which provides connectivity for a plurality of computing devices. Such computing devices are requesters that seek to access target endpoints through the client device. A "target endpoint" can refer to any resource that a requester seeks to access. An example of a target endpoint is a target server, such as an application server, a web server, a cloud server, a storage system, a communication system, a database system, or any other type of resource. Client connections between the client device and the proxy system include traffic communicated to or from the requesters. For example, a requester can establish one or more client connections with one or more target endpoints. Client connections of the multiple requesters may be carried in a client-side secure network tunnel between the client device and the proxy system. Network architectures according to some examples of the present disclosure provide robust connectivity of traffic for each computing device that is to access a target resource through the client device.

FIG. 1 is a block diagram of an example arrangement including a client device 110 communicating with frontend servers 152, 154 of a zero trust network 150. The client device 110 may be a router, a gateway, or another type of network device. More generally, the client device 110 includes a computing device. A computing device can be a personal computing device, a mobile phone, a smartphone, a tablet, a laptop, or another electronic device. Although reference is made to a zero trust network in some examples, it is noted that other types of trust networks can be employed in other examples. In some examples, the client device 110 initiates a communication with the zero trust network 150 to gain access to a target resource in a secure network environment 160 which is not directly accessible to the client device 110. As shown in FIG. 1, the client device 110 establishes a client-side secure network tunnel 120 with the load balancer 130.

In examples where there are a plurality of client devices, a plurality of client-side secure network tunnels can be established between the proxy server 130 and the plurality of client devices, such that each client device has a unique client-side secure network tunnel with the proxy server 130. Establishing separate client-side secure network tunnels between the proxy server 130 and the plurality of client devices is more secure than sharing a common client-side secure network tunnel by the plurality of client devices. For example, a shared common client-side secure network tunnel may mean that the plurality of client devices share a key used for encrypting traffic carried in the shared common client-side secure network tunnel, which is less secure. If one client device of the plurality of client devices that share the same key is compromised, then communications for each of the other client devices that share the key would be compromised.

In some examples, the client device 110 communicates over an unsecured network, such as the Internet. To protect communications of sensitive data over the unsecure network transferred to or from a target server 164 in the secure network environment 160, the client device 110 is configured to communicate with the target server 164 through the zero trust network 150. The target server 164 can be an application server, a web server, a cloud server, or any other type of target resource. Although just one target server 164 is depicted in FIG. 1, in other examples, the secure network environment 160 includes multiple target servers. Also, in further examples, the zero trust network 150 can provide protected access of target servers in multiple secure network environments.

In some examples, the zero trust network 150 provides various secure services. For example, the zero trust network 150 (e.g., the frontend servers 152, 154) can provide any or some combination of the following: a remote desktop protocol (RDP) service between the client device 110 and the target server 164, a secure shell (SSH) access to the target server 164, isolated SSH access to the target server 164, a secure web gateway (SWG) (that filters traffic, enforces policies and ensures regulatory compliance), or other services.

In some examples, the client device 110 initiates a client-side secure network tunnel 120 with a proxy server 130, which can be implemented using one or more computers. For example, the client-side secure network tunnel 120 is implemented utilizing IPSec. The client device 110 transmits a data packet (destined to the target server 164) to the proxy server 130 through the client-side secure network tunnel 120. More generally, the client device 110 transmits data packets of client connections through the client-side secure network tunnel 120 to the proxy server 130. Destinations of the data packets can include one or more target servers in the secure network environment 160. The sources (origins) of the data packets can include one or more requesters 170. A "requester" can refer to an entity, such as a physical electronic device or a virtual computing entity, that is able to access a target resource.

Although just one client-side secure network tunnel 120 is depicted in FIG. 1, in other examples, multiple client-side secure network tunnels can be established between the client device 110 and the proxy server 130.

In some examples, the proxy server 130 includes a routing table 135, which is stored in a memory 136. The memory 136 may be in the proxy server 130 or outside the proxy server 130. The proxy server 130 directs a data packet to a selected server-side secure network tunnel of multiple server-side secure network tunnels 142, 144 based on the routing table 135. In an example, the proxy server 130 is implemented as a virtual machine (VM) including a LINUX based operating system (OS) and an Iptables software program. The Iptables software program allows a system administrator to configure filter rules for data packets, such as IP packets. The filter rules may be in the form of the routing table 135, or the filter rules may have any other form.

In some examples, the proxy server 130 initiates the multiple server-side secure network tunnels 142, 144. Each server-side secure network tunnel is established between the proxy server 130 and a respective frontend server of the zero trust network 150. For example, the server-side secure network tunnel 142 is established between the proxy server 130 and the frontend server 152, and the server-side secure network tunnel 144 is established between the proxy server 130 and the frontend server 154. Each server-side secure network tunnel 142 or 144 may be established using IPSec. Note that it is possible to establish multiple secure network tunnels between the load balancer 130 and any given destination server.

The ability to establish multiple server-side secure network tunnels allows the client-side secure network tunnel 120 to be maintained between the client device 110 and the proxy server 130, while some traffic of client connections in the client-side secure network tunnel 120 is transferred from one server-side secure network tunnel to another server-side secure network tunnel, such as when a frontend server in the zero trust network 150 becomes unavailable. This ability to transfer allows an additional frontend server to be provisioned in the zero trust network 150 to replace a frontend server that has become unavailable.

If the client device 110 were connected with a secure network tunnel directly to a frontend server, and the frontend server becomes unavailable, then the secure network tunnel would have to be terminated, and a new secure network tunnel is established between the client device 110 and the frontend server. This is disruptive to communications of the client device 110. By adding the proxy server 130 between the client device 110 and the zero trust network 150, the client-side secure network tunnel 120 may be maintained active between the client device 110 and the proxy server 130, while traffic of client connections in the client-side secure network tunnel 120 are transferred to another server-side secure network tunnel(s), whether existing or newly established. For example, rather than terminate a secure network tunnel between the client device 110 and the frontend server 152, another frontend server (e.g., 154) may be provisioned for use in communicating traffic of the client device 110.

In an example, a frontend server 152 or 154 of the zero trust network 150 can provide a security service, such as an RDP service, a SSH service, a SWG service, or another service, between the client device 110 and the target server 164. The frontend server 152 or 154 establishes the service by communicating with a backend server 156 of the zero trust network 150. A "backend server" can refer to a server in the zero trust network 150 that is responsible for communications with a network environment (e.g., the secure network environment 160) that includes target resources to be accessed by the requesters 170. The backend server 156 can communicate with a connector 162 in the secure network environment 160. In an example, the connector 162 forwards data packets between the zero trust network 150 and target resources (including the target server 164) of the secure network environment 160.

In some examples, the proxy server 130 is able to update the routing table 135 to change a destination in the zero trust network 150 for data packets received from the client device 110 through the client-side secure network tunnel 120. For example, before the update of the routing table 135, traffic of client connections in the client-side secure network tunnel 120 are transmitted through the server-side secure network tunnel 142 to the frontend server 152. However, after the update of the routing table 135, traffic of the client connections in the client-side secure network tunnel 120 are transmitted through the server-side secure network tunnel 144 to the second frontend server 154. The update of the routing table for re-directing traffic of client connections through a different server-side secure network tunnel can be performed for dynamic load balancing or based on the frontend server 152 becoming unavailable, such as due to a fault of the frontend server 152, a fault of a communication link to the frontend server 152, the frontend server 152 being brought offline to update an outdated version of software or firmware executed on the frontend server 152, or for any other reason.

The ability to maintain the client-side secure network tunnel 120 active allows for zero downtime of communications of the client device 110, since the client device 110 does not have to establish, re-establish, or otherwise alter, the existing client-side secure network tunnel 120 due to a frontend server becoming unavailable.

Furthermore, in some examples of the present disclosure, the proxy server 130 is able to perform load balancing of client connections in the client-side secure network tunnel 120. For example, the proxy server 130 can transmit data packets of a first subset of client connections in the client-side secure network tunnel 120 over the server-side secure network tunnel 142 to the frontend server 152, transmit data packets of a different second subset of client connections in the client-side secure network tunnel 120 over the server-side secure network tunnel 144 to the frontend server 154, and so forth.

If the client device 110 is, for example, a router to which the requesters 170 connect for routing data of the requesters 170, then the load balancing can be performed for traffic in the client connections associated with the requesters 170 that are transported through the client-side secure network tunnel 120 to the proxy server 130. The load balancing can involve increasing or decreasing the number of frontend servers in the zero trust network 150 across which client connections of the client-side secure network tunnel 120 can be distributed. The ability to scale the frontend servers up or down is transparent to the client device 110, and does not require the client device 110 to establish, re-establish, alter, terminate, and the like, any network tunnel.

The network architecture described herein allows, according to some examples, dynamically load balancing of communications between the client device 110 and the zero trust network 150, without the client device 110 having to terminate the client-side secure network tunnel 120 established by the client device 110.

The network architecture describer herein allows, according to some examples, changes to be made at the zero trust network 150, such as upgrading servers, bringing a server offline and back online, and the like, without having to terminate the client-side secure network tunnel 120 connected to the client device 110.

In some examples, the proxy server 130 is deployed in the zero trust network 150 or outside of the zero trust network 150. In further examples, a plurality of proxy servers 130 can be deployed. In examples where the zero trust network 150 includes the proxy server 130 deployed therein, a secure network tunnel would not have to be established between the proxy server 130 and a frontend server 152 in the zero trust network 150. In such examples, the connections between the proxy server 130 and frontend servers in the zero trust network 150 are implicitly secured. In other examples, if the load balancer 130 is outside the zero trust network 150, a server-side secure network tunnel is established between the proxy server 130 and a resource of the zero trust network 150, such as a frontend server.

A proxy manager 140 may also be used with the proxy server 130. The proxy manager 140 may be implemented using one or more computers. Although depicted as being separate from the proxy server 130, in other examples, the proxy manager 140 and the proxy server 130 may be integrated as one entity.

The proxy manager 140 can monitor conditions of resources (including the frontend servers 152, 154) in the zero trust network 150. For example, the conditions monitored can include metrics indicating workloads of the respective frontend servers 152, 154. For example, the metrics can include any or some combination of the following: a metric representing a usage or performance of a processing resource of each frontend server, a metric representing a usage or performance of a memory resource, a metric representing a usage or performance of a network or communication resource, or any other metric that is indicative of how loaded a frontend server is.

The monitoring can be accomplished by using either a push or pull technique. In some cases, in a pull model, the proxy manager 140 can poll the frontend servers for the monitored metrics. In other cases, in a push model, the proxy manager 140 can subscribe to the frontend servers to be notified of any changes in the metrics.

Based on the monitored conditions of the frontend servers, the proxy manager 140 can send control information to the proxy server 130 to adjust the balancing of client connections across server-side secure network tunnels. For example, the proxy manager 140 may send an instruction to the proxy server 130 to move a subset of client connections in the client-side secure network tunnel 120 from a first server-side secure network tunnel to a second server-side secure network tunnel. The second server-side secure network tunnel may already exist, in which case traffic of the subset of client connections can simply be forwarded to the second server-side secure network tunnel, such as by updating the routing table 135. In other cases, the proxy server 130 establishes a new second server-side secure network tunnel over which traffic of the subset of client connections is forwarded.

Figure 2:
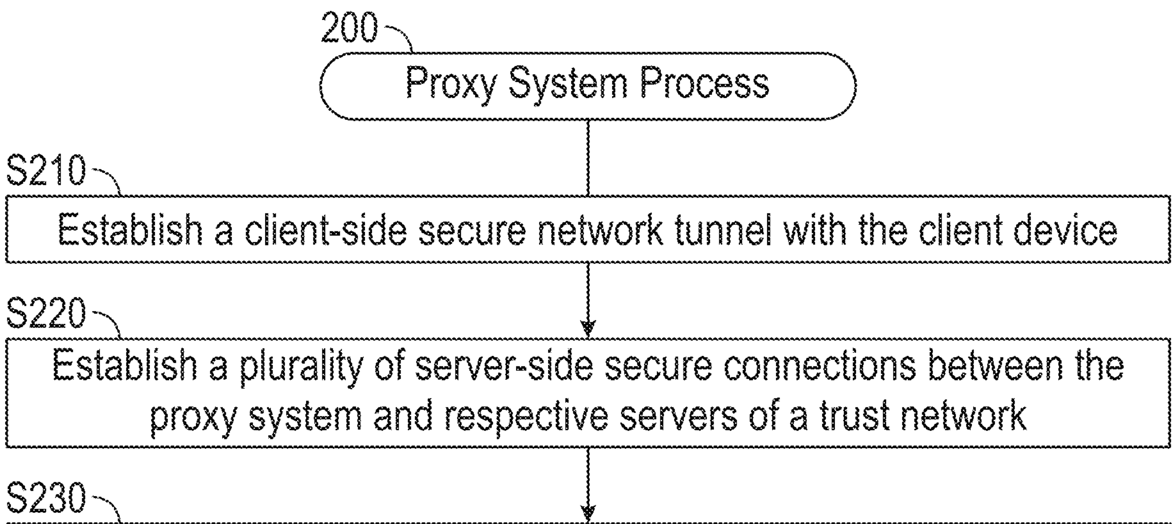
FIG. 2 is a flow diagram of a process according to some examples.

FIG. 2 is a flow diagram of a process 200 of a proxy system (e.g., the proxy server 130 of FIG. 1) according to some examples of the present disclosure, to provide secure network traffic communications between a client device (e.g., 110 in FIG. 1) and a zero trust network (e.g., 150 in FIG. 1).

At S210, the proxy system establishes a client-side secure network tunnel with the client device. In some examples, the proxy system includes a routing table (e.g., 135 in FIG. 1), where the routing table includes an identifier of the client device, and an identifier of a destination server (e.g., a frontend server in the zero trust network 150 of FIG. 1). For example, the identifier of a device (the client device or the destination server) includes any or some combination of the following: an IP address, a name in a namespace, a unique identifier (e.g., a Media Access Control (MAC) address), or another identifier.

An identifier of a device can be read from a data packet, such as in the data or metadata of the data packet transmitted from the client device to the proxy system. The data packet can include a payload that carries the data to be communicated, and a header that contains metadata such as the identifier.

At S220, the proxy system establishes a plurality of server-side secure connections between the proxy system and respective servers (e.g., frontend servers or other types of resources) of a trust network, such as the zero trust network 150 of FIG. 1. Other types of resources with which the proxy system can establish server-side secure connections can include any or some combination of the following: an access portal server, a virtual computing entity such as a container (e.g., a Kubernetes container) or a VM, a serverless function, or another type of resource.

In some examples, a frontend server (e.g., 152 or 154 in FIG. 1) is an RDP frontend server, which provides an RDP service between the client device and a remote server deployed in a secure network (e.g., the target server 164 in the secure network environment 160 of FIG. 1). In a specific example, the RDP frontend server can provision an XRDP container to capture login details and the like from the client device, and the captured login details are utilized to establish an RDP session with the remote server.

In further examples, the frontend server is an SSH frontend server that can initiate an SSH session between the client device and a remote server deployed in a secure network. The SSH frontend server can isolate the remote server, for example utilizing techniques or mechanisms described in more detail in U.S. patent application Ser. No. 18/359,538, entitled "Remote Server Isolation Utilizing Zero Trust Architecture", the entire contents of which are incorporated by reference herein.

In additional examples, an access portal server in the trust network can capture login information, such as login identifiers, authentication information, and so forth from the client device. Such login information may include any or some combination of the following: a username, a password, a passphrase, a cryptographic key, a certificate, an email address, a network address, a name from a namespace, an IP address, a MAC address, or other information useable to authenticate the client device or a user of the client device.

In some examples, the client device can periodically provide the foregoing login information or may provide the login information in response to other events. The provision of the login information can ensure that the user of the client device is an authorized user (i.e., a user who is authorized to access the trust network, the secure network, a combination thereof, and the like).

At S230, the proxy system load balances a plurality of connections of the client device in the client-side secure network tunnel across the servers of the trust network through respective server-side secure connections of the plurality of server-side secure connections, wherein traffic of a first connection of the plurality of connections is transferred through a first server-side secure connection of the plurality of server-side secure connections, and traffic of a second connection of the plurality of connections is transferred through a second server-side secure connection of the plurality of server-side secure connections, and wherein traffic of the plurality of connections includes data packets.

The proxy system can handle a data packet in the following manner. In some examples, handling a data packet, e.g., received from a client device, includes: receiving the data packet from the client device through the client-side secure network tunnel, routing the data packet to the zero trust network through a selected server-side secure connection (e.g., a server-side secure network tunnel), receiving a response from the zero trust network environment through the server-side secure connection, and sending the response to the client device through the client-side secure network tunnel.

In some examples, the proxy system can inspect the received data packet. The data packet may include a client identifier, and the proxy system can query a routing table (e.g., 135 in FIG. 1) for a destination based on the client identifier. For example, the routing table may be implemented as Iptables of a LINUX operating system.

The load balancing performed by the proxy system may be based on control information provided by a proxy manager (e.g., 140 in FIG. 1). For example, the proxy system can receive an instruction from the proxy manager to replace a first server-side secure connection (to a first destination server) with a second server-side secure connection (to a second destination server), which cases at least a subset of client connections in a client-side secure network tunnel to be transferred from the first destination server to the second destination server in the trust network.

In some examples, the proxy system may establish (such as in response to an instruction from the proxy manager) a third server-side secure connection between the proxy system and a third destination server of the trust network. In some cases, the proxy system may terminate the second server-side secure connection in response to determining that the third secure connection has been established and is operational. The second server-side secure connection can be terminated to allow the second destination server to be brought offline, such as for repair or maintenance.

In some examples, balancing data packets of client connections among a plurality of server-side secure connections includes maintaining, for each server-side secure connection, a counter, such that the number of data packets which are directed to each server-side secure connection is counted by a respective counter. In some examples, the proxy system can set a threshold. The threshold may be provided by the proxy manager 140 or another entity. The threshold is used by the proxy system to ensure that the difference between counts of any pair of counters associated with respective server-side secure connections does not exceed the threshold. For example, the proxy system may maintain counter A for server-side secure connection A, counter B for server-side secure connection B, and counter C for server-side secure connection C. As data packets of client connections are passed through the server-side secure connections A, B, and C, the respective counters A, B, and C are incremented. The proxy system compares the counts of counters A, B, and C to one another. If a difference of the counts of any two of the counters A, B, and C exceeds the threshold, the proxy system can cause data packets to be redirected from the server-side secure connection experiencing the heavier traffic to another server-side secure connection experiencing lighter traffic. For example, if the difference between the counts of counters A and B exceeds the threshold, and server-side secure connection B has the heavier traffic as compared to server-side secure connection A, data packets of client connections can be redirected by the proxy system from server-side secure connection B to server-side secure connection A or C, such as by updating the routing table.

In some examples, the proxy system can establish a server-side secure network tunnel to an XFRM interface. In an example, the XFRM interface can communicate with a TUNnel (TUN) device of a frontend server. XFRM refers to a framework for implementing IPSec packet path functionality. A TUN device provides a virtual interface that implements a software-based abstraction of a network by emulating the behavior of physical network cards, such as Ethernet or Wi-Fi cards.

Figure 3:
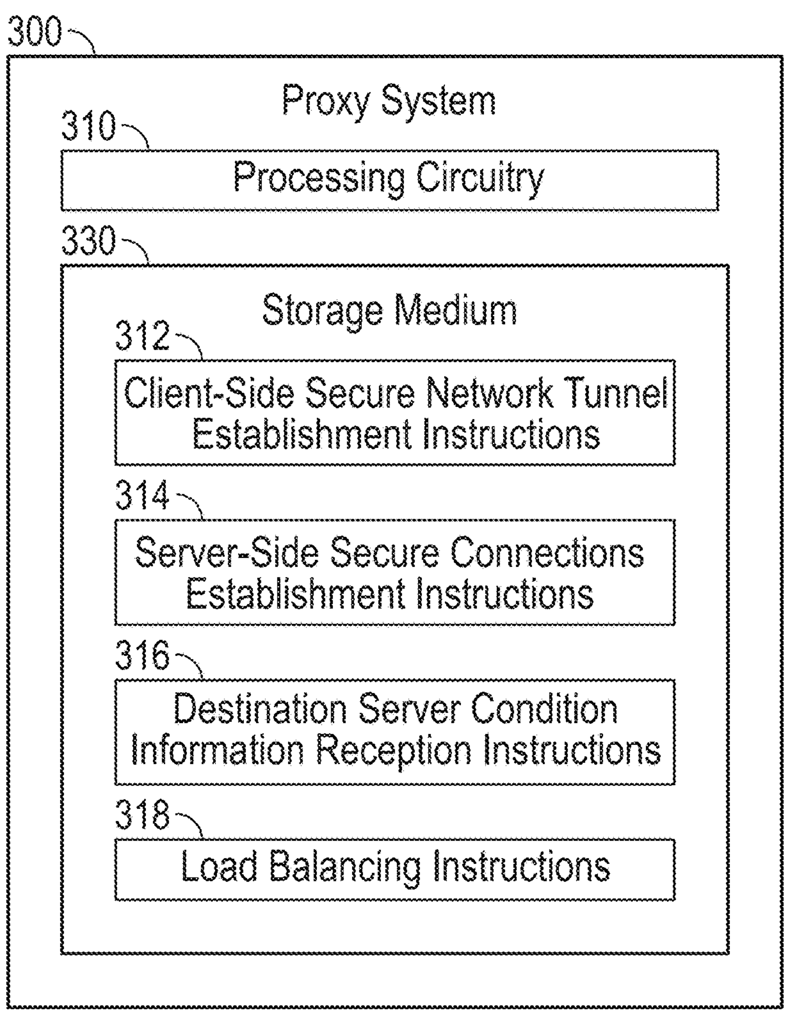
FIG. 3 is a block diagram of a proxy system according to some examples.

FIG. 3 is a block diagram of a proxy system 300 according to some examples of the present disclosure. An example of the proxy system 300 is the proxy server 130 of FIG. 1. The proxy system 300 includes a processing circuitry 310 coupled to a storage medium 330.

The processing circuitry 310 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information. The one or more hardware logic components and circuits can be referred to as one or more hardware processors.

The storage medium 330 can include memory or storage. The memory may be volatile (e.g., random access memory, etc.), non-volatile (e.g., read only memory, flash memory, etc.), or a combination thereof. The memory may include an on-chip memory, an off-chip memory, a combination thereof, and the like. The memory may include a scratch-pad memory for the processing circuitry 310. The storage medium 330 can alternatively or additionally include a magnetic storage, an optical storage, a solid-state storage, a combination thereof, and the like, such as a flash memory, as a hard-disk drive, or other memory technology, or any other medium which can be used to store information.

In some examples, machine-readable instructions for performing various tasks discussed herein may be stored in the storage medium 330. The machine-readable instructions can include any or some combination of the following: software, firmware, middleware, microcode, hardware description language, or otherwise. Machine-readable instructions may include code (e.g., in source code format, binary code format, executable code format, or any other suitable format of code). The machine-readable instructions, when executed by the processing circuitry 310, cause the processing circuitry 310 to perform the various processes described herein.

The machine-readable instructions include client-side secure network tunnel establishment instructions 312 to establish a client-side secure network tunnel between the proxy system 300 and a client device (e.g., 110 in FIG. 1). The client-side secure network tunnel includes client connections of requesters (e.g., 170 in FIG. 1) coupled to the client device.

The machine-readable instructions include server-side secure connections establishment instructions 314 to establish a plurality of server-side secure connections between the proxy system 300 and destination servers in a trust network, such as the frontend servers 152, 154 in the zero trust network 150.

The machine-readable instructions include destination server condition information reception instructions 316 to receive information of conditions of the destination servers in the trust network. In some examples, the information is received from the proxy manager 140 of FIG. 1.

The machine-readable instructions include load balancing instructions 318 to, based on the conditions of the destination servers, load balance the client connections in the client-side secure network tunnel across the destination servers of the trust network through respective server-side secure connections of the plurality of server-side secure connections.

In some examples, the load balancing includes adding a further server-side secure connection to another destination server of the trust network based on the conditions of the destination servers, or terminating a server-side secure connection to a destination server based on a condition of the destination server.

Figure 4:
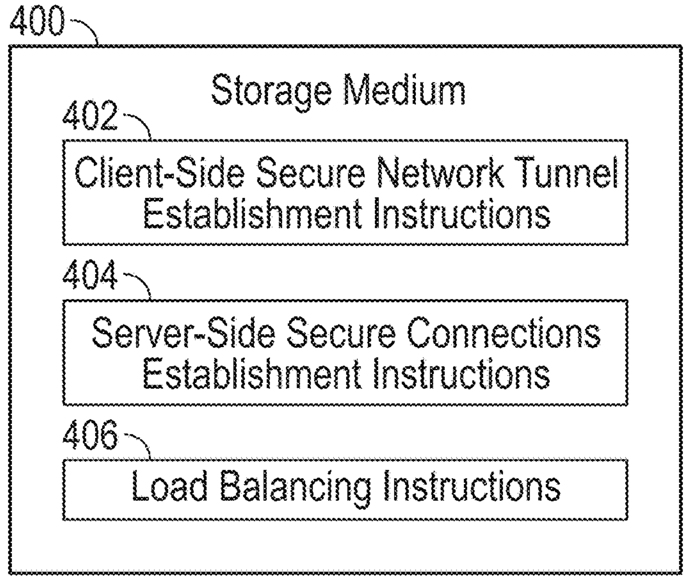
FIG. 4 is a block diagram of a storage medium storing machine-readable instructions according to some examples.

FIG. 4 is a block diagram of a non-transitory machine-readable or computer-readable storage medium 400 storing machine-readable instructions that upon execution cause a proxy system (e.g., the proxy server 130 of FIG. 1) to perform various tasks.

The machine-readable instructions in the storage medium 400 includes client-side secure network tunnel establishment instructions 402 to establish a client-side secure network tunnel between the proxy system and a client device (e.g., 110 in FIG. 1).

The machine-readable instructions in the storage medium 400 includes server-side secure connections establishment instructions 404 to establish a plurality of server-side secure connections between the proxy system and respective servers of a trust network.

The machine-readable instructions in the storage medium 400 includes load balancing instructions 406 to load balance, by the proxy system, a plurality of connections of the client device in the client-side secure network tunnel across the servers of the trust network through respective server-side secure connections of the plurality of server-side secure connections.

In some examples, the plurality of connections in the client-side secure network tunnel include TCP connections.

In some examples, the load balancing of the plurality of connections of the client device across the servers of the trust network is according to a dynamic load balancing process based on conditions of the servers of the trust network.

In some examples, the conditions of the servers of the trust network include an issue impacting a performance of a server of the servers. The issue may include a fault of the server, a fault of a communication link to the server, or the server being overburdened.

In some examples, the conditions of the servers of the trust network includes an update of a server of the servers.

In some examples, the dynamic load balancing process creates a new server-side secure connection to another server of the trust network based on the conditions of the servers.

In some examples, the dynamic load balancing process terminates a server-side secure connection of the server-side secure connections based on the conditions of the servers.

In some examples, the machine-readable instructions cause the proxy system to detect an unavailability of a first server of the servers of the trust network, and based on detecting the unavailability of the first server, transfer a subset of connections of the client device established through a first server-side secure connection of the server-side secure connections to a second server-side secure connection, the subset of connections of the client device being part of the plurality of connections of the client device.

In some examples, the unavailability of the first server is based on a fault of the first server, a fault of a link to the first server, the first server being overburdened, or an update being performed at the first server.

In some examples, the transfer of the subset of connections of the client device from the first server-side secure connection to the second server-side secure connection is performed without re-establishing the client-side secure network tunnel.

All examples and conditional language recited herein are to aid the reader in understanding the principles of the disclosed examples, and are to be construed as being without limitation to such specifically recited examples and conditions. Moreover, all statements herein reciting principles, aspects, and examples are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

In the present disclosure, use of the term "a," "an," or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A non-transitory machine-readable storage medium comprising instructions that upon execution cause a proxy system to:

establish a client-side secure network tunnel according to a tunneling protocol between the proxy system and a network device, the client-side secure network tunnel comprising client connections of requesters connected to the network device;

establish a plurality of server-side secure connections between the proxy system and respective servers of a trust network, wherein one or more target endpoints are accessible to the requesters through the network device and the servers; and load balance, by the proxy system, the client connections of the requesters in the client-side secure network tunnel across the servers of the trust network through respective server-side secure connections of the plurality of server-side secure connections, the load balancing comprising transferring a first client connection of the client connections in the client-side secure network tunnel from a first server-side secure connection of the plurality of server-side secure connections to a second server-side secure connection of the plurality of server-side secure connections.

2. The non-transitory machine-readable storage medium of claim 1, wherein the plurality of server-side secure connections between the proxy system and the respective servers of the trust network comprise a plurality of server-side secure network tunnels between the proxy system and the respective servers of the trust network.

3. The non-transitory machine-readable storage medium of claim 1, wherein the client connections in the client-side secure network tunnel comprise Transmission Control Protocol (TCP) connections.

4. The non-transitory machine-readable storage medium of claim 1, wherein the load balancing of the client connections of the requesters across the servers of the trust network is according to a dynamic load balancing process based on conditions of the servers of the trust network.

5. The non-transitory machine-readable storage medium of claim 4, wherein the conditions of the servers of the trust network comprise an issue impacting a performance of a server of the servers.

6. The non-transitory machine-readable storage medium of claim 5, wherein the conditions of the servers of the trust network comprise an update of a server of the servers.

7. The non-transitory machine-readable storage medium of claim 4, wherein the dynamic load balancing process creates a new server-side secure connection to another server of the trust network based on the conditions of the servers.

8. The non-transitory machine-readable storage medium of claim 4, wherein the dynamic load balancing process terminates a server-side secure connection of the plurality of server-side secure connections based on the conditions of the servers.

9. The non-transitory machine-readable storage medium of claim 1, wherein the instructions upon execution cause the proxy system to:

detect an unavailability of a first server of the servers of the trust network; and based on detecting the unavailability of the first server, transfer a subset of client connections of the requesters established through the first server-side secure connection to the second server-side secure connection.

10. The non-transitory machine-readable storage medium of claim 9, wherein the unavailability of the first server is based on a fault of the first server, a fault of a link to the first server, the first server being overburdened, or an update being performed at the first server.

11. The non-transitory machine-readable storage medium of claim 9, wherein the transfer of the subset of client connections of the requesters from the first server-side secure connection to the second server-side secure connection is performed without re-establishing the client-side secure network tunnel.

12. The non-transitory machine-readable storage medium of claim 1, wherein the requesters comprise an electronic device or a virtual computing entity.

13. The non-transitory machine-readable storage medium of claim 1, wherein the instructions upon execution cause the proxy system to:

inspect a data packet received from the network device, the data packet including a client identifier; and query a routing table for a destination based on the client identifier, wherein the load balancing is based on updating the routing table.

14. The non-transitory machine-readable storage medium of claim 1, wherein the plurality of server-side secure connections comprise server-side secure network tunnels including a first server-side secure network tunnel and a second server-side secure network tunnel, and the instructions upon execution cause the proxy system to:

establish a third server-side secure network tunnel between the proxy system and a further server in the trust network; and terminate the second server-side secure network tunnel in response to determining that the third server-side secure network tunnel is operational.

15. The non-transitory machine-readable storage medium of claim 1, wherein the instructions upon execution cause the proxy system to:

maintain counters for the respective server-side secure connections;

increment a first counter for the first server-side secure connection in response to data packets being directed by the proxy system through the first server-side secure connection;

increment a second counter for the second server-side secure connection in response to data packets being directed by the proxy system through the second server-side secure connection; and determine whether a difference between a first count of the first counter and a second count of the second counter exceeds a threshold, wherein the transferring of the first client connection from the first server-side secure connection to the second server-side secure connection is based on the difference exceeding the threshold.

16. The non-transitory machine-readable storage medium of claim 1, wherein the client-side secure network tunnel is established according to an Internet Protocol Security (IP-Sec) protocol.

17. A method comprising:

establishing, by a proxy system comprising a hardware processor, a client-side secure network tunnel according to a tunneling protocol between the proxy system and a network device, the client-side secure network tunnel comprising client connections of requesters connected to the network device;

establishing, by the proxy system, a plurality of server-side secure connections between the proxy system and respective servers of a trust network, wherein one or more target endpoints are accessible to the requesters through the network device and the servers; and load balancing, by the proxy system, the client connections of the requesters in the client-side secure network tunnel across the servers of the trust network through respective server-side secure connections of the plurality of server-side secure connections, the load balancing comprising updating a routing table at the network device that transfers traffic of a first client connection of the client connections in the client-side secure network tunnel from a first server-side secure connection of the plurality of server-side secure connections to a second server-side secure connection of the plurality of server-side secure connections.

18. The method of claim 17, comprising:

maintaining, by the proxy system, counters for the respective server-side secure connections;

incrementing, by the proxy system, a first counter for the first server-side secure connection in response to data packets being directed by the proxy system through the first server-side secure connection;

incrementing, by the proxy system, a second counter for the second server-side secure connection in response to data packets being directed by the proxy system through the second server-side secure connection; and determining, by the proxy system, whether a difference between a first count of the first counter and a second count of the second counter exceeds a threshold, wherein the transferring of the traffic of the first client connection from the first server-side secure connection to the second server-side secure connection is based on the difference exceeding the threshold.

19. A proxy system comprising:

a processor; and a non-transitory storage medium storing instructions executable on the processor to:

establish a client-side secure network tunnel according to a tunneling protocol between the proxy system and a client device, the client-side secure network tunnel comprising client connections of requesters connected to the client device;

establish a plurality of server-side secure connections between the proxy system and destination servers in a trust network, wherein one or more target endpoints are accessible to the requesters through the client device and the destination servers;

receive information of conditions of the destination servers in the trust network; and based on the conditions of the destination servers, load balance, by the proxy system, the client connections of the requesters in the client-side secure network tunnel across the destination servers of the trust network through respective server-side secure connections of the plurality of server-side secure connections, the load balancing comprising transferring a first client connection of the client connections in the client-side secure network tunnel from a first server-side secure connection to a second server-side secure connection.

20. The proxy system of claim 19, wherein the load balancing comprises:

adding a further server-side secure connection to another destination server of the trust network based on the conditions of the destination servers, or terminating a server-side secure connection to a destination server based on a condition of the destination server.

* * * * *